May 25, 1943.  R. C. BENSON ET AL  2,319,842
VALVE CONTROL
Filed Sept. 10, 1942  6 Sheets-Sheet 1

FIG.I.

INVENTORS:
RONALD C. BENSON,
WILLIAM F. PLUME
By: Arthur Middleton
ATTORNEY

May 25, 1943.  R. C. BENSON ET AL  2,319,842
VALVE CONTROL
Filed Sept. 10, 1942  6 Sheets-Sheet 2

INVENTORS:
RONALD C. BENSON,
WILLIAM F. PLUME
By: Autum Middleton
ATTORNEY

May 25, 1943.  R. C. BENSON ET AL  2,319,842
VALVE CONTROL
Filed Sept. 10, 1942   6 Sheets-Sheet 3

FIG. 2ᵃ

INVENTORS:
RONALD C. BENSON,
WILLIAM F. PLUME
BY: *Arthur Middleton*
ATTORNEY

INVENTORS:
RONALD C. BENSON,
WILLIAM F. PLUME
By: Austin Middleton
ATTORNEY

Patented May 25, 1943

2,319,842

UNITED STATES PATENT OFFICE 2,319,842

VALVE CONTROL

Ronald C. Benson, Merchantville, and William F. Plume, Audubon, N. J., assignors to Philadelphia Gear Works, Inc., Philadelphia, Pa., a corporation of Pennsylvania Application September 10, 1942, Serial No. 457,814

7 Claims. (Cl. 74—52)

This invention relates to power-driven valve operators provided with means for optional manual operation. Where power-driven as well as manually actuating mechanism is provided in a valve operator, provision must be made to avoid accidents that are liable to occur to the mechanism or to the operator or to both, if the power drive is started while the operator is manipulating the manually actuated means. Preventive or safety means have been designed for such valve operators, such as automatic de-clutching devices effective to disconnect the manually actuated means when the power is started, or vice versa, in the form of devices that disconnect the power or power-driven means as and when the manual means are operated.

It is among the objects of this invention to provide improved drive gear construction containing power driven as well as manually operated actuating means that is compact, simple in construction, fool-proof and safe in the aforementioned respects, easy to assemble, with ready accessibility to all parts. Another object is that the improved drive gear construction should be substantially self-contained and attachable as a unit to the frame or yoke that in turn is fixed to the valve housing, whereby the act of attaching the unit to the frame establishes driving connection with the valve. Another object is to avoid the use of de-clutching means and yet to have the power-driven and the manually-operated means functionally so inter-related that they will not interfere with each other's operation and that no damage is caused should they by inadvertence be operated simultaneously.

In order to attain these ends, there is provided a drive gear unit in which power-driven and manually operated gear devices are functionally interconnected at all times through differential or planetary gear means, which act as a motion-absorbing means should the manual means be operated while the power drive is active.

More specifically, these ends are attained by providing a drive gear train which has interposed in it a differential or planetary gear device.

If a certain member, which shall herein be called a cage member, of this gear device is prevented from rotating, the planetary gear device simply acts as reduction gearing in the power drive. On the other hand, if that cage member of the gear device is rotated manually while the power driven portion remains still, the manual rotation will operate the valve through the planetary gearing. The motion absorbing safety feature of the differential gear device comes into effect if an attendant should rotate the cage member while the power driven parts are functioning to operate the valve. In that case, manual operation by the attendant will have no effect upon the functioning of the mechanism except that it will either slightly retard or slightly accelerate the motion imparted to the valve by the power drive. If the attendant releases the manual operating means, they stop moving, and the power drive will continue to work at its normal rate of speed translation through the reduction ratio of the planetary gear to operate the valve.

According to one feature the improved drive gear unit of the valve operator comprises a primary shaft that is motor driven, a secondary shaft co-axial with the primary shaft, planetary or differential gear operatively interconnecting those ends of both shafts that adjoin each other, and a gear element at the free end of the secondary shaft from which the valve is actuated through suitable motion transmitting means.

A cage member, or as it is herein alternatively called a differential member, carrying planetary gears, is rotatable about the axis of the primary and the secondary shafts, and it can be optionally rotated by hand, or remain stationary. The planetary gears of the differential gear device mesh with a surrounding internal gear that is unitary and co-axial with the secondary shaft and with a central or sun gear that is unitary and co-axial with the primary shaft. Manual operation of the valve functions when the cage member of the differential device is rotated while the primary shaft remains still. On the other hand, while the primary motor-driven shaft is running, manual operation will be substantially ineffectual or neutralized since the manual rotation is absorbed in the differential gear device without substantially influencing the valve actuating effect of the power driven parts. Under that condition, manual operation will do nothing but either slightly accelerate or slightly retard the motion imparted to the valve by the power means. In this way the manual operation even if superposed upon the power operation, can do no harm either to the mechanism or to the attendant.

According to a more specific feature, the cage member is rotated by a worm drive of which the worm gear is unitary and co-axial with the cage member, and the worm is manually rotatable and self-locking. Another worm gear, co-axial with the first one, rotates the primary shaft, being driven by a power driven worm that also is self-locking. With this arrangement the valve can be operated manually by rotating the cage member while the primary or power driven shaft remains stationary due to the self-locking effect of its worm drive, or it can be power-operated by allowing the motor to drive the primary shaft while the cage member remains stationary due to the self-locking effect of its worm drive.

Another and further specific feature relates to the manner of mounting the differential or cage member within the novel drive gear mechanism. This cage member carrying the planetary gear or gears, has its one end rotatable in the hub portion of the internal gear of the differential gear device, and its other end journalled in a wall or portion or partition of the gear housing, which housing portion extends transversely of the shaft axis and intermediate the two worm gears. This feature accordingly also is concerned with the specific mounting of the primary or power driven shaft which has its free end journalled in the gear housing, while its opposite end being surrounded by or telescoped into the cage member, is journalled in that cage member.

Still another feature lies in the fact that the construction of the novel gear drive mechanism of the valve operator is in the form of a self-contained assembly unit attachable as such to the main frame of the power-driven valve construction. This assembly unit in fact may also comprise the motor for power operation and the handwheel for manual operation.

According to a practical embodiment the improved drive mechanism of this valve operator is particularly suited for combination with a crank-driven quick-acting valve such as disclosed in the co-pending application of Ronald C. Benson and Nelson H. Mageoch, filed April 30, 1941, Ser. No. 391,078.

In such a valve construction the crank drive itself comprises a connecting rod, a crosshead, a reciprocating rod between the crosshead and the valve, and resilient stroke compensating means associated or unitary with the crosshead. In that embodiment the crank arm is unitary with a large gear that has driving connection with the improved drive gear mechanism which mechanism is in the form of a self-contained assembly unit. This unit or the gear housing thereof is attachable laterally to the crank case. Both worm shafts extend in opposite directions from the gear housing, so that the motor on the one side and a handwheel on the opposite side of the gear housing are readily accessible.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to us, but such embodiment is to be regarded as typical only of many possible embodiments, and the invention is not to be limited thereto.

The novel features considered characteristic of this invention are set forth with particularity in the appended claims. The invention itself, however, both as to its organization and its method of operation, together with additional objects and advantages thereof, will best be understood from the following description of a specific embodiment when read in connection with the accompanying drawings, in which:

The novel valve operator mechanism is herein shown to be applied to the crank-operated quick-acting valve construction of the kind that is substantially also disclosed in the copending application Ser. No. 391,078, disclosing stroke-compensating resilient means in the crosshead of the crank mechanism. The following description therefore need not go into a detailed discussion of the function and importance of these resilient means, but will offer a description of the crank actuated valve construction broadly in addition to the description of the more specifically novel parts of the drive gear mechanism whereby the crank mechanism and thus the valve is actuated. The description will also bring out the features having to do with the particular adaptation of the design of the novel drive gear mechanism to the crank-actuated quick-acting valve.

Views of the entire assembly of this power-operated valve construction according to Figs. 1, 2, 2a and 3 include a valve body or housing 10 upon which is fastened as by flange and bolt connection 11 a yoke or bonnet 12 in which reciprocates a valve stem 13 that is connected with a valve member or valve gate 14. The reciprocating movement of the valve stem 13 causes the valve gate 14 to be lifted from or to be lowered upon its seat 15. Surrounding the valve stem 13 is a substantially cylindrical guide structure 16 having flange and bolt connections 16a with the bonnet 12, and provided with a pair of hand holes 17 and 18 having removable covers 19 and 20 respectively. Screened breather openings 19a and 20a respectively are provided in the hand hole covers. The guide structure 16 serves as guide track for a crosshead 21 that is operatively connected with the valve stem 13 by means of a resilient stroke-compensating device collectively designated by the numeral 22. It comprises compression springs 23 confined between the crosshead 21 and a terminal plate 24 fastened to the free end of the valve stem 13, by means of a threaded sleeve 24a in conjunction with lock nuts 24b and 24c and adjustable spacer bolts 25 whereby the springs are held confined and upon which the terminal plate 24 is slidable. The heads of the spacer bolts 25 are in the form of pinions 25a meshing with a larger central gear 25b that is rotatable about the valve stem 13. In this way all spacer bolts 25 are operatively interconnected in such a manner that if the pre-load on the springs 22 is to be changed by shortening or lengthening the effective length of the spacer bolts 25, the rotation of one spacer bolt 25 will, through the gear connection, cause the rotation of all the other spacer bolts 25 to the same degree, thereby equally adjusting all bolts.

The crosshead 21 has a pivotal connection 26 with one end of a connecting rod 27, the other end of which has bearing connection with a crank pin 28 that interconnects the crank arms 29 and 30 of a single throw crank shaft 31, and is secured by lock nuts 27a and 27b. The crank arms constitute part of identical large gears 32 and 33 respectively by means of which the crank can be rotated to actuate the valve gate 14. The crank shaft is journaled at each end in a split crankcase or housing 34 consisting of a pair of half shells 34a and 34b bolted together at 35, the crankcase 34 being fastened to the cylindrical guide structure 16 as by flange and bolt connection 36. A pinion shaft 37 has fixed thereon a pair of identical pinions 38 and 39 (see Figs. 2a and 4) having driving engagement with the respective large gears 32 and 33. One end of the pinion shaft 37 is journaled in the half shell 34b of the crankcase by means of a conical roller bearing not particularly shown except for the fact that it is held in place by a cover member or plate 34c, while the other end of the pinion shaft 37 is connected with the drive mechanism hereinafter to be described and which, as will be seen, is in turn supported upon and by the other half shell 34a of the crankcase 34.

Consequently there will now be described the drive gear mechanism that is operable optionally either by power or by hand, enlarged views or sections of that mechanism being shown in Figs. 4, 5, 6 and 7. The design of this drive gear mechanism for alternative power or manual operation as herein shown, is such that it can be effectively applied for the efficient operation of the crank-operated quick-acting type of valve construction herein shown. Such structural combination is the most suitable and practical embodiment of the invention that we are aware of at this time, but it does not exclude other structural combinations from the scope of this invention. This gear mechanism is collectively designated by the numeral 40 and constitutes a self-contained assembly unit that is bolted to the half shell 34a of the crankcase 34 as is more clearly shown in Fig. 5, which assembly unit may also include a drive motor as well as a hand wheel.

Figure 5:
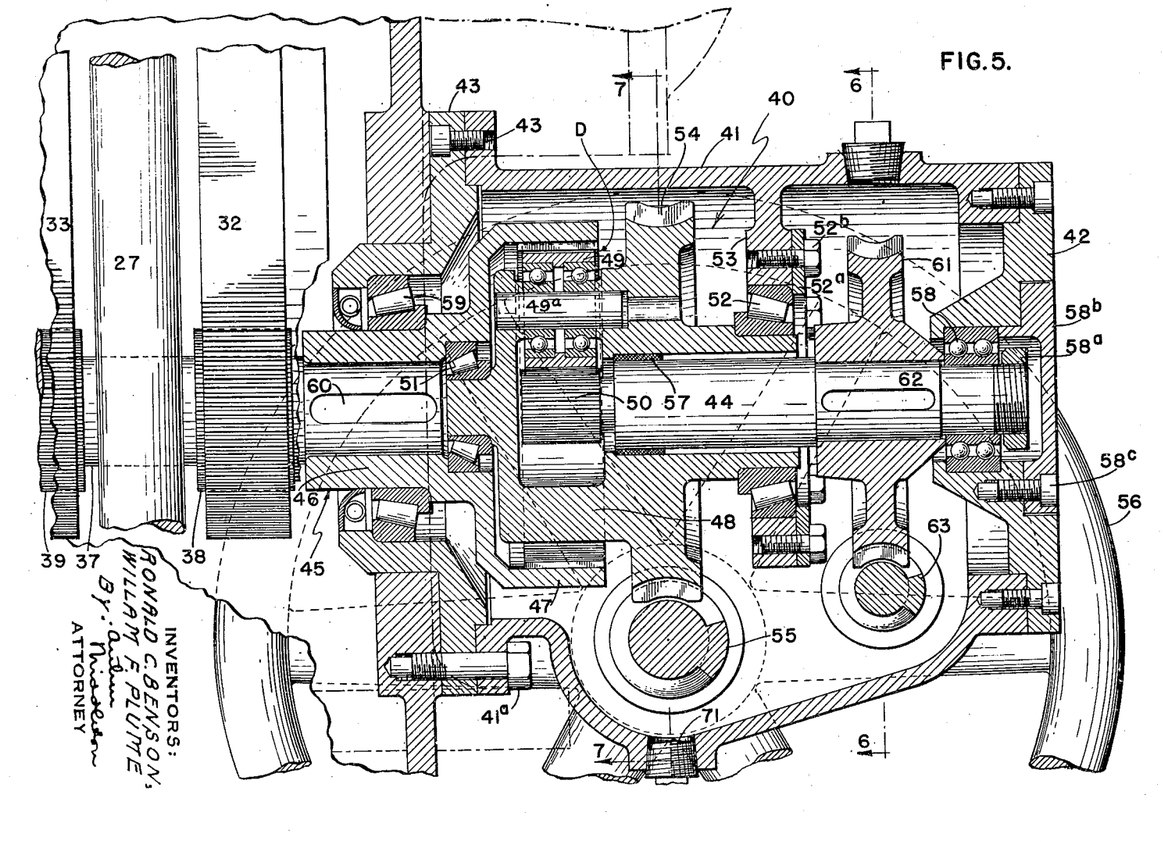
Fig. 5 is a section through the novel drive gear unit taken along the line 5—5 in Fig. 4.

This gear mechanism connects with the aforementioned pinion shaft 37 and comprises a housing that consists of a main body portion or open ended shell 41 that surrounds the gear mechanism proper, an outer end plate 42 bolted to the shell 41 as at 41a to close the outer end thereof, and an inner end plate 43 screwed to the shell 41 as at 43a to close the inner end thereof.

The gear mechanism proper comprises a power driven or primary shaft 44 and a secondary shaft 45 co-axial therewith, which secondary shaft may be said to include the pinion shaft 37 when the drive mechanism is mounted in place and operative. The secondary shaft 45 may also be said to include a hub portion 46 that is part of a secondary or low speed internal gear member 47 which in turn constitutes an operating part of a planetary reduction or differential gear device designated by the collective designation "D," which gear device is functionally interposed between the primary shaft 37 and the secondary shaft 45. This differential or reduction gear device further comprises a rotary cage member 48 co-axial with the primary and secondary shafts 37 and 45 respectively, which cage member carries a set of planetary gears 49 rotatable thereon on pins 49a. The planetary gears 49 operate within the internal gear member 47 and have meshing engagement therewith as well as with a driving pinion or sun-gear 50 that is fixedly provided upon the adjacent end of the primary or power driven shaft 44. The cage member or, as it is herein also called, the differential member 48, has its one end journaled in a conical roller bearing 51 disposed in the interior of the hub portion 46 of the internal gear member 47. The other end of the cage member 48 has a conical roller bearing 52 mounted in a transverse intermediate wall portion or partition 53 that is part of or, as shown, is integral with the housing shell 41 of the gear mechanism. A retaining annulus 52a bolted as at 52b to the partition 53 holds the roller bearing 52 in place. The cage member 48 furthermore has unitary or integral therewith a co-axial worm gear 54 and is further rotatable by a worm 55 that is self-locking with respect to the worm gear, and the worm 55 can be optionally either rotated by a hand wheel 56 provided thereon or can be left non-rotational.

The inner end of the primary or power driven shaft 44 is telescopically surrounded by the outer end portion of the cage member 48, and has therein a rotary bearing shown to be in the form of a bearing sleeve 57. The outer end of the primary shaft 44 is rotatably supported by means of a ball bearing 58 provided in the outer end plate or cover portion 42 of the gear housing or shell 41. The extreme outer end of the primary shaft 44 protruding beyond the ball bearing 58 is threaded to provide thereon a securing thrust-nut 58a. The ball bearing 58 is held in place by a cap 58b being fastened to the end plate 42 by means of screws 58c.

The secondary shaft 45 in part represented by the hub portion 46 of the internal gear member 47 has a conical roller bearing 59 whereby the hub portion 46 is rotatably mounted in the inner end plate 43 of the gear housing portion or shell 41. It will be noted that this bearing 59 thus also furnishes operating support for the pinion shaft 37 which is fixed in the hub portion 46 by means of a key connection 60. The primary shaft 44 is driven by a worm gear 61 fixed thereto as by a key connection 62. A power driven worm 63 engages the worm gear 61 and is self-locking with respect thereto.

Figure 6:
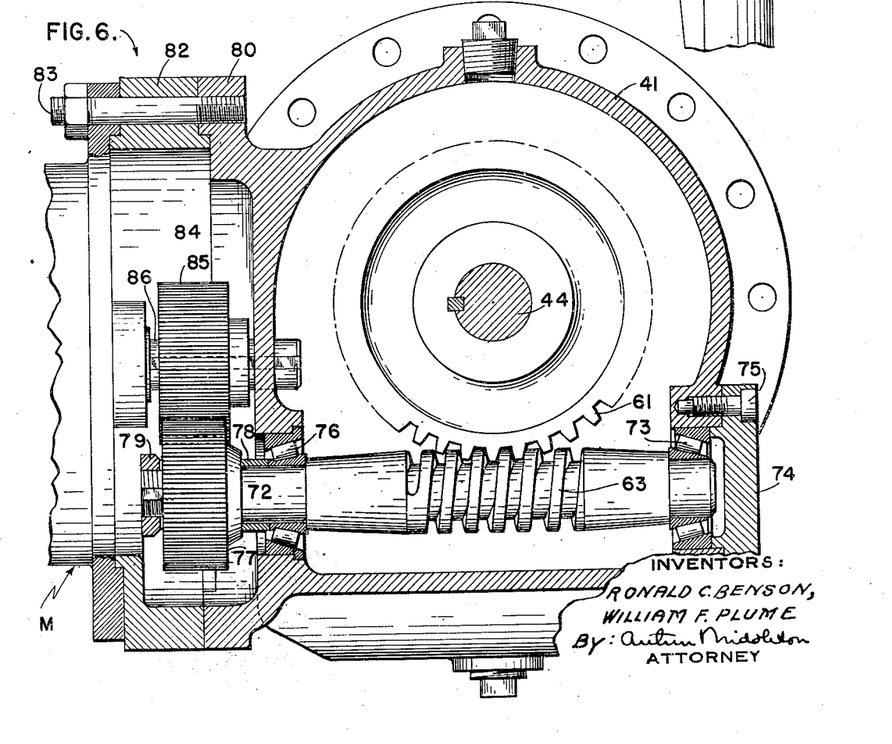
Fig. 6 is a section through the drive gear mechanism along the line 6—6 in Fig. 5.
Figure 7:
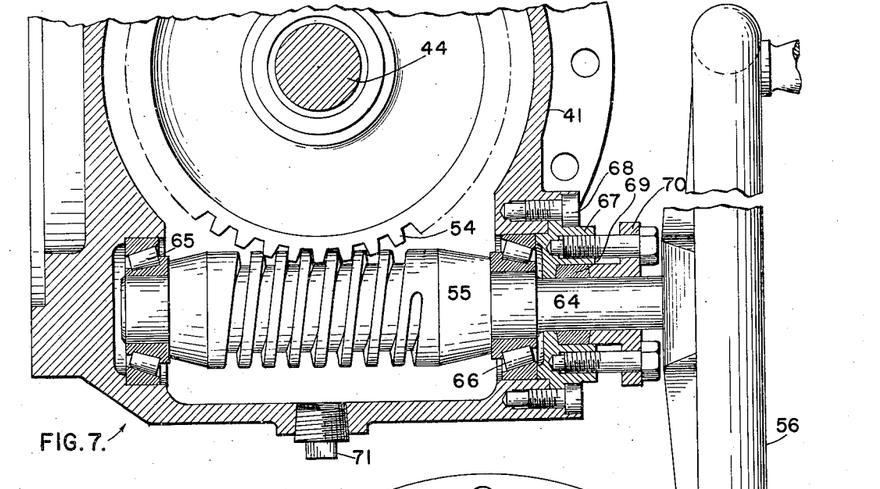
Fig. 7 is a section through the drive gear mechanism along the line 7—7 in Fig. 5.

The mounting of the manually rotatable worm 55 and of the power driven worm 63 is more clearly shown in the sections according to Fig. 7 and Fig. 6 respectively. In Fig. 7 the worm 55 is shown to be integral with a worm shaft 64, one end of which has a conical roller bearing 65 in the gear housing portion 41, the other end has a conical roller bearing 66 in the gear housing portion 41, which latter bearing is held in place by a securing member 67 fastened to the housing portion 41 as by screws 68. A seal 69 and gland 70 provided in the securing member 67 prevent the escape of lubricant through the bearing 66 from the interior of the gear housing. A drain plug 71 is provided at the lowest point of the gear housing.

The mounting of the power driven worm 63 in the gear housing portion 41 is clearly shown in Fig. 6. The worm 63 is shown to be integral with a worm shaft 72, one end of which has a conical roller bearing 73 in the gear housing portion 41 and is secured against outward thrust by a thrust cap 74 fastened to the gear housing portion 41 as by screws 75. The other end of the power driven worm shaft 72 has a conical roller bearing 76 in the gear housing portion 41. A free end portion of the power driven worm shaft 72 has fixed thereon a pinion 77 for transmitting driving power thereto. The pinion 77 is spaced from the bearing 76 by a spacer sleeve 78 and is furthermore secured against axial displacement by a securing nut 79 on the extreme outer threaded end portion of the worm shaft, 72.

Upon the gear housing portion 41 and shown to be integral therewith is provided a flange portion 80 that surrounds the power driven pinion 77 and serves for connection of the gear housing 41 with a drive motor "M." The housing of this drive motor has a corresponding flange 81 for connection with the flange portion 80. A substantially annular spacer member 82 is interposed between the two flanges 80 and 81 secured together by bolts 83. Due to the spacer member 82 there is created a gear chamber 84 between the housing portion 41 and the motor M, which gear chamber accommodates the pinion 77 and a companion gear or pinion 85 having driving engagement therewith and in turn being fixed upon the armature shaft 86 of the motor M. To the free or outer end of the motor housing there is attached by means of flange connection 87 an additional casing portion 88 enclosing an electrically controlled brake device for effecting substantially prompt stoppage of the motor armature when the power is stopped, to avoid uncontrolled over-running. No details of this brake device are herein shown, since the function of such a device is disclosed in the copending application, Ser. No. 391,078. A connector box 89 is shown to be provided on the motor housing for electrical connections.

Figure 1:
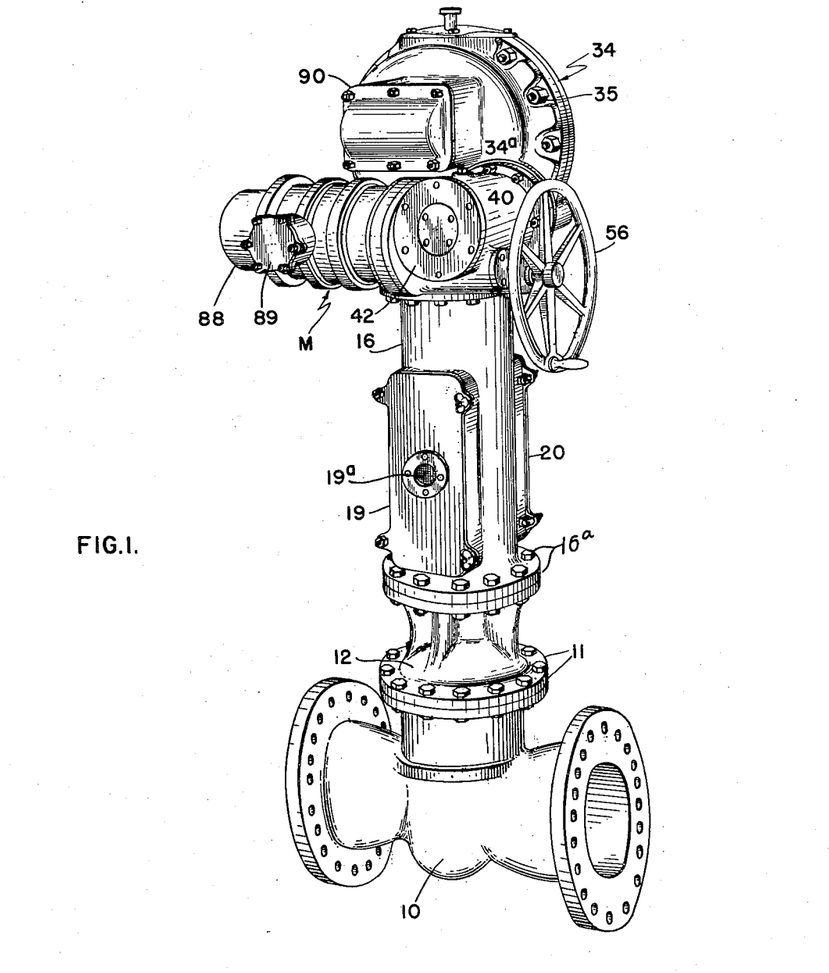
Fig. 1 is a perspective view substantially upon the front or motor side of the improved valve operator showing the application of the novel drive gear mechanism or unit to a crank-operated, quick-acting valve.
Figure 4:
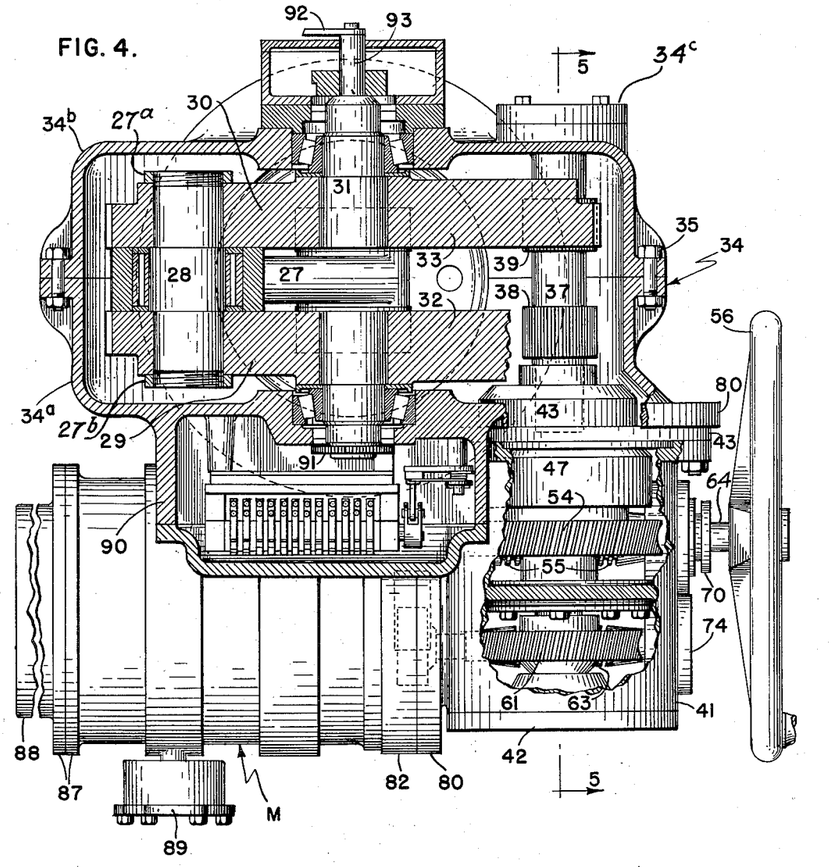
Fig. 4 is a greatly enlarged cross-section taken along the line 4—4 in Fig. 2 but assuming a viewer to face the motor side of the assembly, and with additional parts of the drive gear housing broken away to expose parts of the novel drive gear mechanism.

Viewing Fig. 1 and Fig. 4 it will be understood that the two worm shafts 55 and 63 extend horizontally and parallel to each other in opposite directions from the gear housing 41 so that the motor M is disposed horizontally laterally to the left of the gear housing portion 41, and the hand wheel 56 is disposed laterally to the right of the gear housing portion 41.

On the half shell 34a of the crankcase 34 and above the motor M there is further-more shown to be provided a switch box 90 in which is mounted a limit switch or electrical control device that is timed with the rotation of the valve actuating crankshaft as through a timing gear 91 fixed to the crankshaft, whereby the starting and stopping of the valve actuating mechanism can be automatically controlled and whereby, for instance, also the function of one valve mechanism may be electrically correlated to or interlocked or timed with the operation of another valve actuating mechanism. In this way a battery of individual valve actuating mechanisms can be automatically operated according to a predetermined sequence or schedule. The switch device in the switch box 90 is herein only diagrammatically indicated since it constitutes no part of the present invention. At the opposite end of the valve actuating crankshaft there is provided indicator means in the form of a pointer 92 fixed to an axial extension 93 of reduced diameter of the crankshaft. The axial extension 93 penetrates an auxiliary casing 94 attached to the adjoining portion of the crankcase 34, and the outer face of this auxiliary casing serves as a dial (see Fig. 2), upon which the position of the crank can be read, since the position of the pointer directly coincides with the position of the crank.

Figures 2, 3:
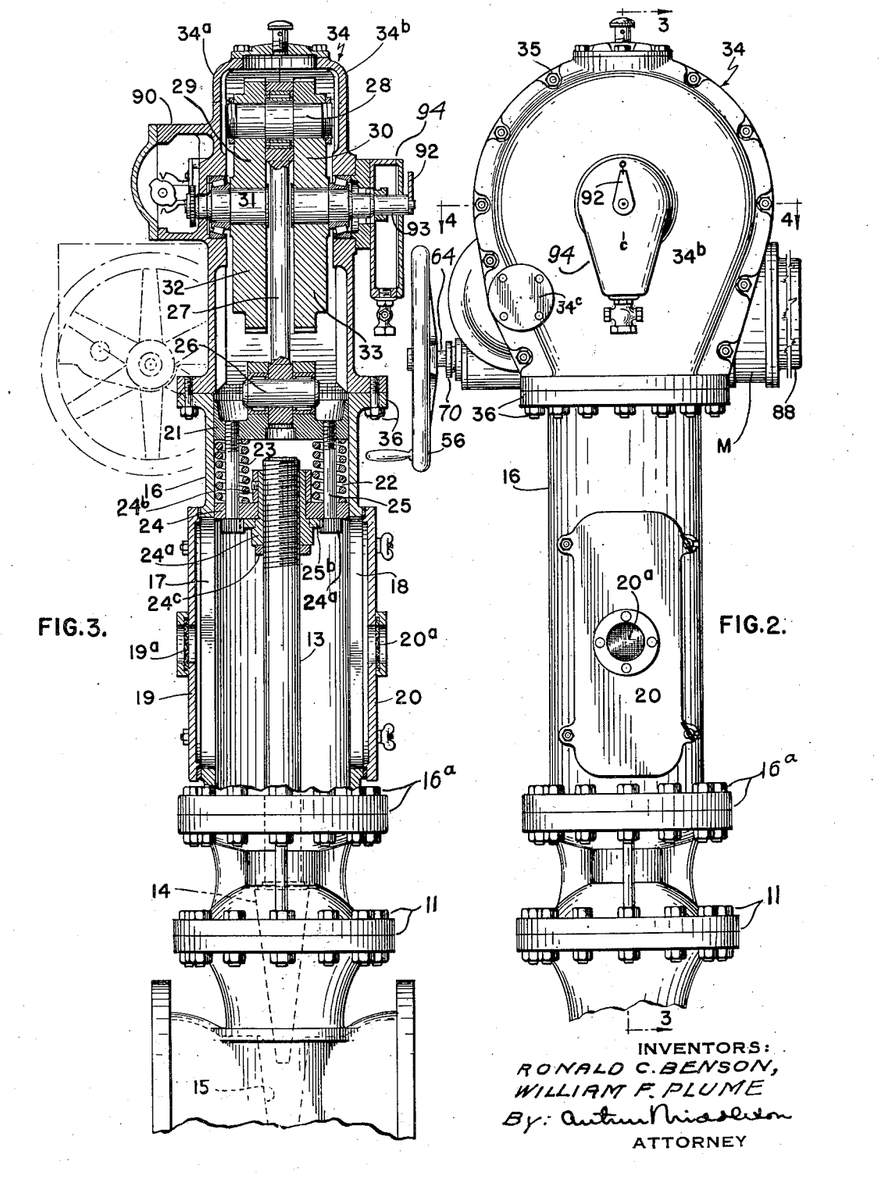
Fig. 2 is a rear view of the construction shown in Fig. 1.
Fig. 3 is a longitudinal part-sectional view along the line 3—3 in Fig. 2.
Figure 2A:
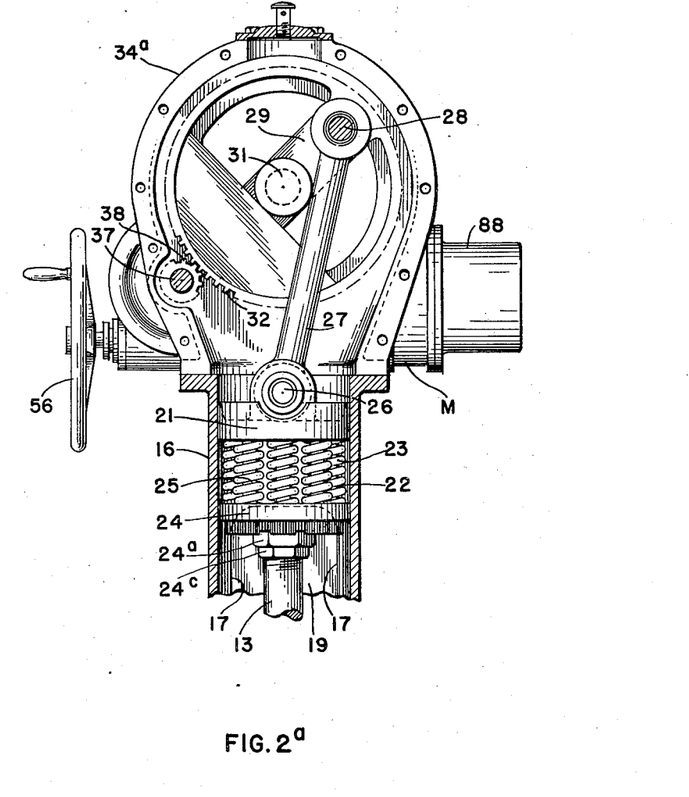
Fig. 2a is a view substantially as in Fig. 2, however with the lower portion of the construction broken away, leaving a view of the crank drive means proper with one-half shell of the crank case removed.

In Fig. 2 there is shown to be marked on this dial the top as well as the bottom center position of the crank. The top center position indicates the wide open position of the valve while the bottom center position indicates the closed position of the valve. It will be understood that due to a differential of the valve stroke and the stroke of the valve stem 13, there will take place a compression of the resilient stroke compensating means or compression springs 23, when the crank reaches or about reaches its bottom dead center or valve closing position. The auxiliary casing 94 may enclose means (not shown) for controlling the admission of auxiliary steam under the yoke or bonnet 12 for sealing the valve gate 14 in closed position against internal pressure of a pressure medium in the valve housing 10. This auxiliary steam pressure connection is herein not particularly shown.

Operation

There will now be described the function of the mechanism: (a) when the power actuated means are operated, (b) when manually actuated means are operated, (c) when the power-actuated and the manually actuated means operate simultaneously.

When the power-actuated means operate, the rotation of the armature shaft 37 of the motor M is transmitted through pinions 85 and 77 to the worm shaft 72 thereby driving the worm gear 61 and with it the primary shaft 44 and the central or sun-gear 55. Meanwhile the self-locking manually operable worm 50 remains inactive and non-rotating, thereby preventing through worm 54 the cage member 48 from rotating. Consequently, the thus power driven sun-gear 50 will drive the planetary gears 49 as the cage member 48 remains stationary, and thereby at a correspondingly reduced ratio will drive the internal gear 47 and hence the hub portion 46 and the pinion shaft 37 both of which together constitute the secondary shaft that is unitary with the internal gear member 47. The pinions 38 and 39 on the pinion shaft 37 thus drive the correspondingly large gears 32 and 33, and thereby actuate the crank mechanism including the crank pin 28, the connecting rod 27, the crosshead 21, with its resilient stroke compensating device 22, and the valve stem 13. The automatic switch control means in the switch box 90 in conjunction with the electrically controlled brake device in casing 88, effect the stoppage of the drive motor when the crank pin 28 is in its top center or its bottom center position, which positions correspond to the wide open or the closed position respectively of the valve gate member 14, which positions are outwardly indicated by the pointer 92. The proper seating of the gate member 14 under a suitable seating pressure is insured because of the function of the stroke compensating device 22, since the stroke of the crank is somewhat longer than the stroke of the valve stem 13, and the stroke differential is absorbed by a corresponding compression of the springs 23 during the seating period of the gate member 14.

When manually operating the mechanism, the handwheel 56 is rotated and thereby the worm 55 and the worm gear 54 with its cage member 48. At this time the self-locking power driven worm 63 is assumed to be inactive and nonrotating, thus preventing rotation of the worm gear 61, the primary shaft 44. With the central or sun-gear 50 thus held stationary, the manually rotated cage or differential member 48 will cause the planetary gear 49 to rotate while braced against the central gear 50, and thereby in turn to drive the internal gear 47 and its secondary shaft 45, and thus to actuate the valve gate member 14 through the pinions 37 and 38 and the pinion shaft 37, rotating the corresponding large gears 32 and 33 and thereby the crank mechanism that actuates the gate member 14. The manually actuated means can be operated through the handwheel 56 whenever necessary or desired, and they can, for instance, be operated in order to place the crank in exact bottom dead-center position when it is desired to relieve the spacer bolts 25 of their spring load in order to adjust the effective spacing length of the bolts.

Now, considering the case, when an attendant begins to turn the handwheel 56 while the power-actuated means are in operation, or else the power starts while the attendant is turning the handwheel. Evidently, because of the function of the differential or cage member 48, there will be no injurious reaction relative to the power drive, nor to the attendant holding the handwheel, nor between the mechanism themselves. That is to say, the only effect of such coincidence of manual and power operation will be that the motion imparted to the mechanism by the rotation of the handwheel will either add or subtract (depending upon the direction of rotation of the handwheel), from the rate of driving movement that is being imparted to the valve actuating mechanism by the power drive.

We claim:

1. A gear drive construction for operation optionally by hand or power, comprising a power-driven primary shaft, means for optionally either driving the shaft or else causing it to remain non-rotating, a secondary shaft co-axial with said primary shaft, a planetary gear device operatively interconnecting the adjoining end portions of said primary and said secondary shafts, which planetary gear device comprises an internal gear member fixed on said secondary shaft, a sun gear member fixed on said primary shaft, a housing in which said primary and said secondary shafts are rotatably mounted, a rotatable cage member disposed co-axial with said shafts and intermediate adjoining end portions thereof, which cage member surrounds the adjacent end portions of the primary shaft, and which member is in turn surrounded by said internal gear member, at least one planetary gear rotatably mounted on said cage member and meshing with said sun gear as well as with said internal gear member, a journal bearing disposed internally of said internal gear for supporting one end of the cage member, an intermediate journal bearing mounted in a portion of said housing to support the opposite end of said cage member, a bearing disposed internally of said cage member for rotatably supporting the adjacent end portion of said primary shaft, and means for optionally either manually rotating said cage member or else causing it to remain non-rotating.

2. A gear drive construction according to claim 1, in which the rotating means for said cage member comprises a worm gear co-axial and unitary with said cage member, and a self-locking worm for said worm gear.

3. A gear drive construction according to claim 1, in which the rotating means for said cage member comprises a worm gear co-axial and unitary with said cage member, a self-locking worm for said worm gear, and means for manually rotating said worm, and the means for rotating the primary shaft comprises a worm gear on that shaft, a worm for the last mentioned worm gear, and power means for rotating the worm.

4. A gear drive construction according to claim 1, in which the rotating means for said cage member comprises a worm gear co-axial and unitary with said cage member, a self-locking worm for said worm gear, and means for manually rotating said worm, and the means for rotating the primary shaft comprises a worm gear on that shaft, a worm for the last mentioned worm gear, and power means for rotating the worm, with the addition that said intermediate journal bearing is mounted in a partition of the housing which extends transversely of the shaft axes and intermediate the two worm gears.

5. A gear drive construction according to claim 1, in which said secondary shaft comprises a hub portion extending from said internal gear, and said hub portion is journaled in said housing.

6. A gear drive construction according to claim 1, in which said housing has one removable end portion, and journal bearing means therein for the free end portion of the primary shaft.

7. A gear drive construction according to claim 1, in which said housing has one removable end portion, journal bearing means therein for the free end portion of the primary shaft, and a removable end portion at the opposite end of the housing, and journal means therein for said secondary shaft.

RONALD C. BENSON.
WILLIAM F. PLUME.